United States Patent
Wu

(10) Patent No.: US 7,233,671 B2
(45) Date of Patent: Jun. 19, 2007

(54) METHOD FOR STORING A SECURITY START VALUE IN A WIRELESS COMMUNICATIONS SYSTEM

(75) Inventor: Chih-Hsiang Wu, Taipei Hsien (TW)

(73) Assignee: Innovative Sonic Limited, Road Town, Tortola (VG)

( * ) Notice: Subject to any disclaimer, the term of this patent is extended or adjusted under 35 U.S.C. 154(b) by 743 days.

(21) Appl. No.: 10/248,731

(22) Filed: Feb. 13, 2003

(65) Prior Publication Data
US 2004/0162055 A1 Aug. 19, 2004

(51) Int. Cl.
*H04K 1/00* (2006.01)
*H04L 9/00* (2006.01)
*H04M 1/66* (2006.01)
*H04M 1/68* (2006.01)
*H04M 3/16* (2006.01)

(52) U.S. Cl. .............. 380/270; 380/277; 455/410; 455/411

(58) Field of Classification Search ........... 713/150; 380/247; 455/403
See application file for complete search history.

(56) References Cited

U.S. PATENT DOCUMENTS 6,643,513 B2 * 11/2003 Timonen et al. .......... 455/438
6,963,745 B2 * 11/2005 Singh et al. .............. 455/437
7,020,455 B2 * 3/2006 Krishnarajah et al. .... 455/410
2002/0066011 A1 * 5/2002 Vialen et al. ............. 713/150

OTHER PUBLICATIONS

3rd Generation Partnership Project: Technical Specification Group Radio Acces Network; Radio Resource Control protocol Specification Release 1999. 3GPP TS 25.331 V3.10.0 (Mar. 2002). (Select Chapters included, Whole document viewable at http://www.3gpp.org/ftp/Specs/html-info/25331.htm).*
3rd Generation Partnership Project: Technical Specification Group Radio Access Network; UE Procedures in Idle Mode and Procedures for Cell Reselection in Connected mode Release 1999. 3GPP TS 25.304 V3.10.0 (Mar. 2002). (http://www.3gpp.org/ftp/Specs/html-info/25304.htm).*

(Continued)

*Primary Examiner*—Ayaz Sheikh
*Assistant Examiner*—Michael Cervone
(74) *Attorney, Agent, or Firm*—Birch, Stewart, Kolasch & Birch, LLP

(57) ABSTRACT

A wireless device first successfully completes an Inter-RAT procedure, which is either an Inter-RAT handover, Inter-RAT cell reselection or Inter-RAT cell change order from UTRAN procedure. The wireless device then determines if a USIM is present. If the USIM is present, the wireless device determines if a new security key set was received and unused for ciphering and integrity functions during a current RRC connection. If a new key set was present and unused, the wireless device stores a value of zero into the USIM as a security START value for the CN domain associated with the RRC connection.

20 Claims, 8 Drawing Sheets

OTHER PUBLICATIONS

"Universal Mobile Telecommunications System (UMTS); Radio Resource Control (RRC) protocol specification", 3GPP TS 125.331 Version 3.12.0, Sep. 2002, ETSI. France. XP002382364.

"Universal Mobile Telecommunications System(UMTS); 3G security; Security architecture", 3GPP TS 133.102 version 5.0.0, Jun. 2002, ETSI, France. XP002382365.

"3rd Generation Partnership Project; Technical Specification Group Services and System Aspects;3G Security, Security Architecture", 3GPP TS 33.102 v3. 12.0, Jun. 2002, Section 6.3-6.6, 3GPP.

"3rd Generation Partnership Project, Technical Specification Group Radio Access Network; Radio Resource Control(RRC):Protocol Specification", 3GPP TS 25.331 v3. 12.0, Sep. 2002, Section:8.3.7;8.3.9;8.3.11;8.5.2;8.5.9. 3GPP.

* cited by examiner

METHOD FOR STORING A SECURITY START VALUE IN A WIRELESS COMMUNICATIONS SYSTEM

BACKGROUND OF INVENTION

1. Field of the Invention

The present invention relates to a wireless communications device. More particularly, the present invention relates to the storing of a security START value in non-volatile memory of a wireless communications device.

2. Description of the Prior Art

The 3$^{rd}$ Generation Partnership Project (3GPP) specifications 3GPP TS 25.331 V3.12.0 (2002–09) "Radio Resource Control (RRC) Protocol Specification" and 3GPP TS 33.102 V3.12.0 (2002–06) "Security architecture", both of which are included herein by reference, provide technical description of a Universal Mobile Telecommunications System (UMTS), and related security protocols thereof. The UMTS discloses a device (typically a mobile device), termed user equipment (UE), in wireless communications with one or more base stations. These base stations (so-called Node Bs), with their corresponding Radio Network Controllers (RNCs), are collectively termed the UMTS Terrestrial Radio Access Network, or UTRAN for short. In general, from the standpoint of security, peer entity radio resource control (RRC) layers on the UE and UTRAN sides establish one or more radio access links with each other to exchange signaling and user data by way of RRC protocol data units (PDUs). In the following brief background, which is taken from the above-indicated document 3GPP TS 33.102, familiarity with 3GPP protocols is assumed.

Please refer to FIG. 1. FIG. 1 illustrates the use of integrity algorithm f9 to authenticate the data integrity of a signaling message. Input parameters into the f9 algorithm include an Integrity Key (IK), an integrity sequence number (COUNT-I), a random value generated on the network side (FRESH), a direction bit DIRECTION, and finally the signaling message data MESSAGE held within the RRC PDU. Based upon these input parameters, the wireless equipment computes an authentication code MAC-I for data integrity verification, by way of the integrity algorithm The MAC-I code is then appended to the corresponding signaling message when sent over the radio access link. A receiver computes XMAC-I from the received signaling message in the same manner as the sender computed the equivalent MAC-I on the sent signaling message, and verifies the data integrity of the received signaling message by comparing the receiver-side computed XMAC-I code to the received MAC-I code.

Please refer to FIG. 2. FIG. 2 is a block diagram of the data structure of the COUNT-I value depicted in FIG. 1. The integrity sequence number COUNT-I is 32 bits long. COUNT-I is composed of two parts: a "short" sequence number and a "long" sequence number. The "short" sequence number forms the least significant bits of COUNT-I, while the "long" sequence number forms the most significant bits of COUNT-I. The "short" sequence number is a 4-bit RRC sequence number RRC SN that is present in each RRC PDU. The "long" sequence number is a 28-bit RRC hyper frame number RRC HFN, which is incremented at each RRC SN cycle. That is, upon detection of rollover of the RRC SN within a RRC PDU, the RRC HFN is incremented in the RRC layer. Whereas the RRC SN is transmitted with the RRC PDU, the RRC HFN is not transmitted and is instead maintained by the peer entity RRC layers of the wireless device and the UTRAN.

The RRC HFN is initialised by means of a parameter START, which is described in section of the above-indicated document 3GPP TS 33.102. The UE, and the RNC to which the UE is assigned, then initialise the 20 most significant bits of the RRC HFN to the START value; the remaining bits of the RRC HFN are initialised to 0.

Please refer to FIG. 3. FIG. 3 illustrates the ciphering of user and signalling data over a radio access link. As with integrity checking, the input parameters into the ciphering algorithm f8 are the cipher key CK, a time dependent input COUNT-C, the bearer identity BEARER, the direction of transmission DIRECTION, and a value LENGTH, which is the length of the keystream required. Based on these input parameters the f8 algorithm generates an output keystream KEYSTREAM BLOCK, which is used to encrypt an input plaintext block PLAINTEXT to produce the output ciphertext block CIPHERTEXT. The input parameter LENGTH affects only the length of KEYSTREAM BLOCK, and not the actual bits in KEYSTREAM BLOCK.

The ciphering sequence number COUNT-C is 32 bits long. There is one COUNT-C value per up-link radio bearer and one COUNT-C value per down-link radio bearer in radio link control (RLC) acknowledged mode (AM) or RLC unacknowledged mode (UM) connections. The RLC layer lies below the RRC layer, and may be thought of as a layer-2 interface. For all transparent mode (TM) RLC radio bearers of the same core network (CN) domain, COUNT-C is the same, and COUNT-C is also the same for both the uplink and downlink TM connections.

Please refer to FIG. 4. FIG. 4 is a block diagram of the COUNT-C value of FIG. 3 for all connection modes. COUNT-C is composed of two parts: a "short" sequence number and a "long" sequence number. The "short" sequence number forms the least significant bits of COUNT-C, while the "long" sequence number forms the most significant bits of COUNT-C. The update of COUNT-C depends on the transmission mode as described below:

- For RLC TM on a dedicated channel (DCH), the "short" sequence number is the 8-bit connection frame number (CFN) of COUNTIt is independently maintained in the UE MACentity and the serving RNC (SRNC) MAC-d entity. The SRNC is the RNC to which the UE is assigned, and through which the UE communicates with the network. The "long" sequence number is the 24-bit MACHFN, which is incremented at each CFN cycle.
- For RLC UM mode, the "short" sequence number is a 7-bit RLC sequence number (RLC SN), which is obtained from the RLC UM PDU header. The "long" sequence number is a 25-bit RLC UM HFN, which is incremented at each RLC SN cycle. RLC HFNs are analogous, in this respect, to RRC HFNs, but are maintained by the RLC layer in the wireless device (both on the UE side and the RNC side).
- For RLC AM mode, the "short" sequence number is the 12-bit RLC sequence number (RLC SN) obtained from the RLC AM PDU header. The "long" sequence number is the 20-bit RLC AM HFN, which is incremented at each RLC SN cycle.

The hyperframe numbers (HFNs) above are initialized by means of the parameter START, which is described in section of 3GPP TS 33.102. The UE and the RNC initialize the 20 most significant bits of the RLC AM HFN, RLC UM HFN and MACHFN to START. The remaining bits of the RLC AM HFN, RLC UM HFN and MACHFN are initialized to zero.

Authentication and key agreement, which generates cipher/integrity keys, is not mandatory at call set-up, and there is therefore the possibility of unlimited and malicious re-use of compromised keys. A mechanism is needed to ensure that a particular cipher/integrity key set is not used for an unlimited period of time, to avoid attacks using compromised keys. The USIM, which is nonvolatile memory within the UE, therefore contains a mechanism to limit the amount of data that is protected by an access link key set.

The CN is divided into two distinct and separate domains: a circuit switched (CS) domain, and a packet switched (PS) domain. Each time an RRC connection is released, the values $START_{CS}$ and $START_{PS}$ of the bearers that were protected in that RRC connection are compared with the maximum value, THRESHOLD. $START_{CS}$ is the START value used for the CS domain. $START_{PS}$ is the START value used for the PS domain. If $START_{CS}$ and/or $START_{PS}$ have reached the maximum value THRESHOLD, the UE marks the START value in the USIM for the corresponding CN domain(s) as invalid by setting the $START_{CS}$ and/or $START_{ps}$ to THRESHOLD. The UE then deletes the cipher key and the integrity key stored on the USIM, and sets the key set identifier (KSI) to invalid (refer to section of 3GPP TS 33.102). Otherwise, the $START_{CS}$ and $START_{PS}$ are stored in the USIM. START value calculation is indicated in section 8.5.9 of 3GPP TS 25.331, and is typically obtained from the most significant bits of the greatest COUNT-C or COUNT-I value within the domain. The maximum value THRESHOLD is set by the operator and stored in the USIM.

When the next RRC connection is established, START values are read from the USIM for the appropriate domain(s). Then, the UE triggers the generation of a new access link key set (a cipher key and an integrity key) if $START_{CS}$ and/or $START_{PS}$ has reached the maximum value, THRESHOLD, for the corresponding core network domain(s).

At radio connection establishment for a particular serving network domain (CS or PS) the UE sends the $START_{CS}$ and the $START_{PS}$ value to the RNC in the RRC connection setup complete message. The UE then marks the START values in the USIM as invalid by setting $START_{CS}$ and $START_{PS}$ to THRESHOLD. The purpose of doing this is to prevent unintentional reuse of START values if the UE should be turned off or otherwise incapacitated before new START values can be written back to the USIM.

In addition to the above, sections 8.3.7, 8.3.9, 8.3.11 and 8.5.2 of 3GPP TS 25.331 also indicate when to store START values in the USIM.

The 3GPP protocol enables a UE to switch over to another wireless protocol, such as a Global System for Mobile Communications (GSM) protocol, which is performed by one of various so-called Inter-Radio access technology (Inter-RAT) procedures. Please refer to FIG. 5. FIG. 5 is a simple block diagram of an Inter-RAT procedure taking place. Initially, a UE 20 has an established RRC connection 21 with a 3GPP UTRAN 10. The RRC connection 21 may be in either the CS domain 12 or the PS domain 14, though typically in any Inter-RAT procedure the RRC connection 21 will be in the CS domain 12, and so this is assumed in the following. As the UE 20 moves closer to the range of a GSM network 30, a decision may be made by the UTRAN 10 to switch the UE 20 over to the GSM network 30. When the Inter-RAT procedure completes successfully, the UE 20 will have established a connection 23 with the GSM network 30.

The connection 21 with the UTRAN is subsequently dropped. Consequently, the START value within the UE 20 USIM must be updated. In this example, the $START_{CS}$ value would need to be updated within the USIM.

The START value should reflect how long a particular cipher/integrity key has been used between the UE 20 and the UTRAN 10. However, the current 3GPP protocol incorrectly handles START values during Inter-RAT handover, Inter-RAT cell reselection and Inter-RAT cell change order from UTRAN procedures. Consider, for example, the steps that the UE is to perform upon successful completion of an Inter-RAT handover, as specified by section 8.3.7.4 of 3GPP TS 25.331. These steps indicate that, regarding handling of START values, upon successfully completing the Inter-RAT handover, the UE should:

1>if the USIM is present:
2>store the current START value for every CN domain in the USIM [50];
2>if the "START" stored in the USIM [50] for a CN domain is greater than or equal to the value "THRESHOLD" of the variable START_THRESHOLD:
3>delete the ciphering and integrity keys that are stored in the USIM for that CN domain;
3>inform the deletion of these keys to upper layers.
1>if the SIM is present:
2>store the current START value for every CN domain in the UE;
2>if the "START" stored in the UE for a CN domain is greater than or equal to the value "THRESHOLD" of the variable START_THRESHOLD:
3>delete the ciphering and integrity keys that are stored in the SIM for that CN domain;
3>inform the deletion of these keys to upper layers.

As previously each time the START value is read from the USIM, the UE marks the START value in the USIM as invalid by setting that START value to the THRESHOLD value, so as to prevent unintentional reuse of the same security configuration. At radio connection establishment for a particular serving network domain (CS or PS) the UE sends the START value (CS or PS) to the RNC in the RRC connection setup complete message. If the START value is equal to THRESHOLD, the network assigns a new key set (CS or PS). Due to the manner in which the security protocols handle key synchronization, it is possible for the UE to have a new key set, while continuing to use the old key set for the RRC connection. Under this condition, the current START value will be quite high, exceeding the THRESHOLD value, despite the fact that a new key set is available. This is not accounted for by the Inter-RAT handover, Inter-RAT cell reselection or Inter-RAT cell change order from UTRAN procedures. Under these three procedures, when a new key set has been assigned, but currently unused, the UE will:

1) Determine the USIM is present,
2) Store the START value in the USIM,
3) Determine that the stored START value exceeds the THRESHOLD value,
4) Delete the ciphering and integrity keys, and
5) Inform the upper layers of this deletion.

In the above, the new key set is removed, which is wholly unnecessary. Key sets are radio resources that should be conserved, and used as efficiently as possible. Further, the above forces new key sets to be constructed. The key sets are transmitted over the radio interface, and hence unnecessary assignment of key sets is also a waste of radio resources.

SUMMARY OF INVENTION

It is therefore an objective of the claimed invention to correct the handling of START values by a UE for Inter-RAT handover, Inter-RAT cell reselection and Inter-RAT cell change order from UTRAN procedures so as to prevent the unnecessary deletion of new key sets.

Briefly summarized, the preferred embodiment of the claimed invention provides a method and associated wireless device that handles START values during an Inter-RAT procedure in such a manner as to prevent deletions of new key sets. The wireless device first successfully completes an Inter-RAT procedure, which is either an Inter-RAT handover, Inter-RAT cell reselection or Inter-RAT cell change order from UTRAN procedure. The wireless device then determines if a USIM is present. If the USIM is present, the wireless device determines if a new security key set was received and unused for ciphering and integrity functions during a current RRC connection. If a new key set was present and unused, the wireless device stores a value of zero into the USIM as a security START value for the CN domain associated with the RRC connection.

It is an advantage of the claimed invention that by checking if a new and unused key set is present for the RRC connection, the present invention avoids an excessively high START value from being written into the USIM. This, in turn, prevents the new key set from being deleted, and thus conserves radio resources.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings, which are given by way of illustration only, and thus are not limitative of the present invention, and wherein.

DETAILED DESCRIPTION

Figure 6:
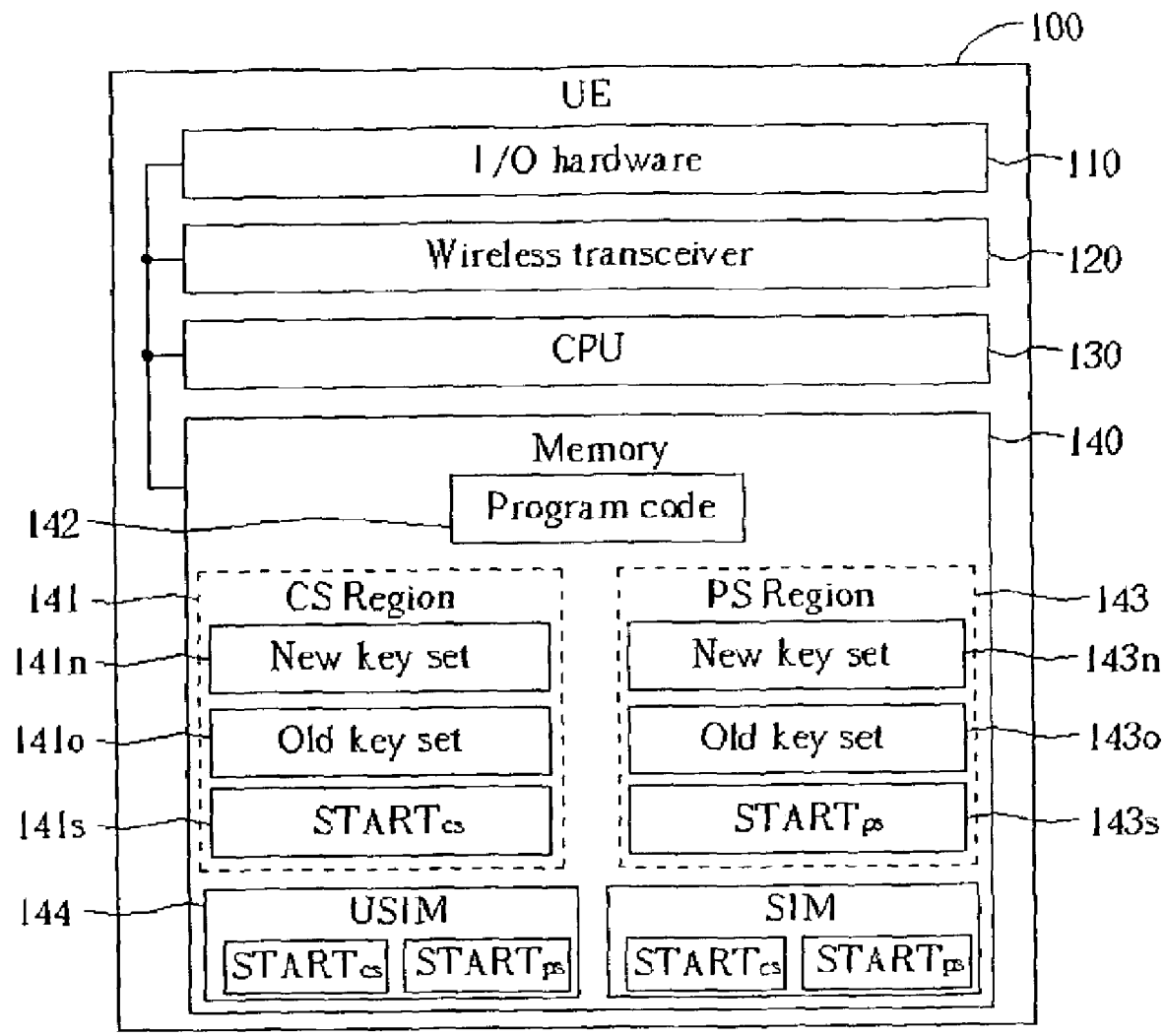
FIG. 6 is a simple block diagram of a wireless device 100 according to a preferred embodiment of the present invention.

Please refer to FIG. 6. FIG. 6 is a simple block diagram of a wireless device 100 according to a preferred embodiment of the present invention. The wireless device 100 includes input/output (I/O) hardware 110, a wireless transceiver 120 and memory 140 that are all connected to and under the control of a central processing unit (CPU) 130 in a manner familiar to those of regular skill in the art. The I/O hardware 110 may include, for example, a display and speaker for output, and a keypad and microphone for input. The wireless transceiver 120 enables the wireless device 100 to send and receive wireless signals. The CPU 130 controls the functionality of the wireless device 100 according to program code 142 contained within the memory 140 and executable by the CPU 130. In most aspects the wireless device 100 is identical to that of the prior art, but for modifications made to the program code 142 to implement the present invention method. How to effect such changes to the program code 142 should be clear to one of ordinary skill in the art after reading the following detailed description of the present invention method.

As in the prior art, the present invention wireless device 100 is capable of performing an Inter-RAT procedure so as to switch over from a 3GPP protocol to another protocol, such as GSM. To do this, the wireless device 100 must first establish a radio resource control (RRC) connection with the UTRAN. This RRC connection can be in the PS domain or the CS domain. The wireless device then performs an Inter-RAT procedure, which may be either an Inter-RAT handover procedure, an Inter-RAT cell reselection procedure, or an Inter-RAT cell change order from UTRAN procedure. The RRC connection procedures, and the Inter-RAT procedures, are identical to the prior art, and so do not need to be elaborated upon here. Upon successfully completing the Inter-RAT procedure, the wireless device 100 then performs the present invention method steps. These steps state that after successful completion of the Inter-RAT procedure, the wireless device 100 should:

1>if the USIM is present, for each CN domain:
  2>if a new security key set was received for this CN domain but was not used either for integrity protection or ciphering during this RRC connection:
    3>set the START value for this domain to zero; and
    3>store this START value for this domain in the USIM.
  2>else:
    3>if the current "START" value, as determined by a predetermined formula for a CN domain, is greater than or equal to the value "THRESHOLD" of the variable START_THRESHOLD:
      4>delete the ciphering and integrity keys that are stored in the USIM for that CN domain; and
      4>inform the deletion of these keys to upper layers.
    3>else:
      4>store the current "START" value for this CN domain on the USIM.
1>else:
  2>if the SIM is present, for each CN domain:
    3>if a new security key set was received for this CN domain but was not used either for integrity protection or ciphering during this RRC connection:
      4>set the START value for that domain to zero; and
      4>store this START value for that domain in the UE.
    3>else:
      4>if the current "START" value, as determined by the predetermined formula for a CN domain, is greater than or equal to the value "THRESHOLD" of the variable START_THRESHOLD:
        5>delete the Kc key that is stored in the SIM;
        5>delete the ciphering and integrity keys that are stored in the UE for that CN domain;
        5>set the "START" values for both CN domains to zero and store them in the UE; and 5>inform the deletion of these keys to upper layers.
4>else:
5>store the current "START" value for every CN domain in the UE.

Figure 7A:
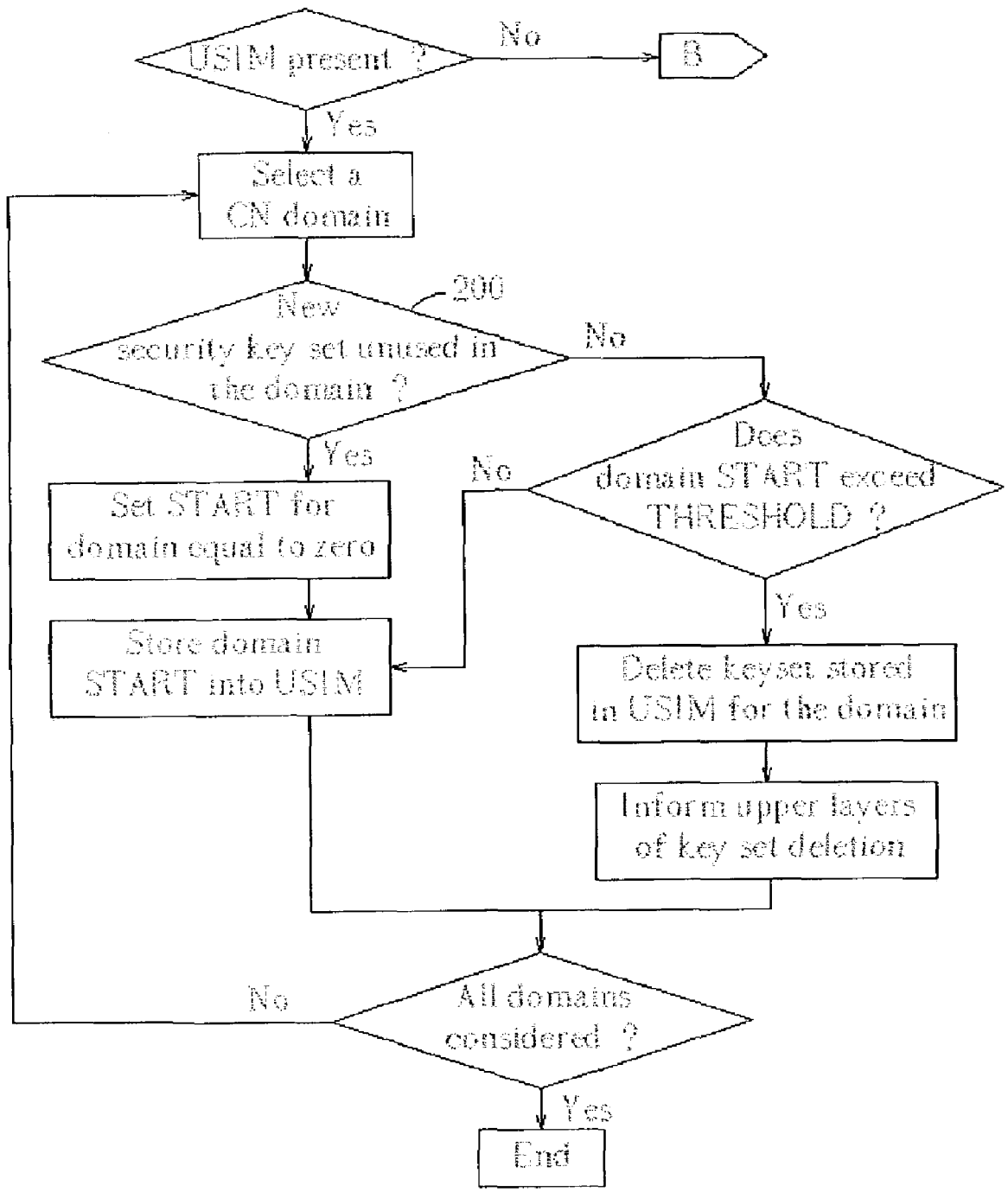
FIGS. 7A and 7B are flow chart diagrams illustrating steps of the present invention method.
Figure 7B:
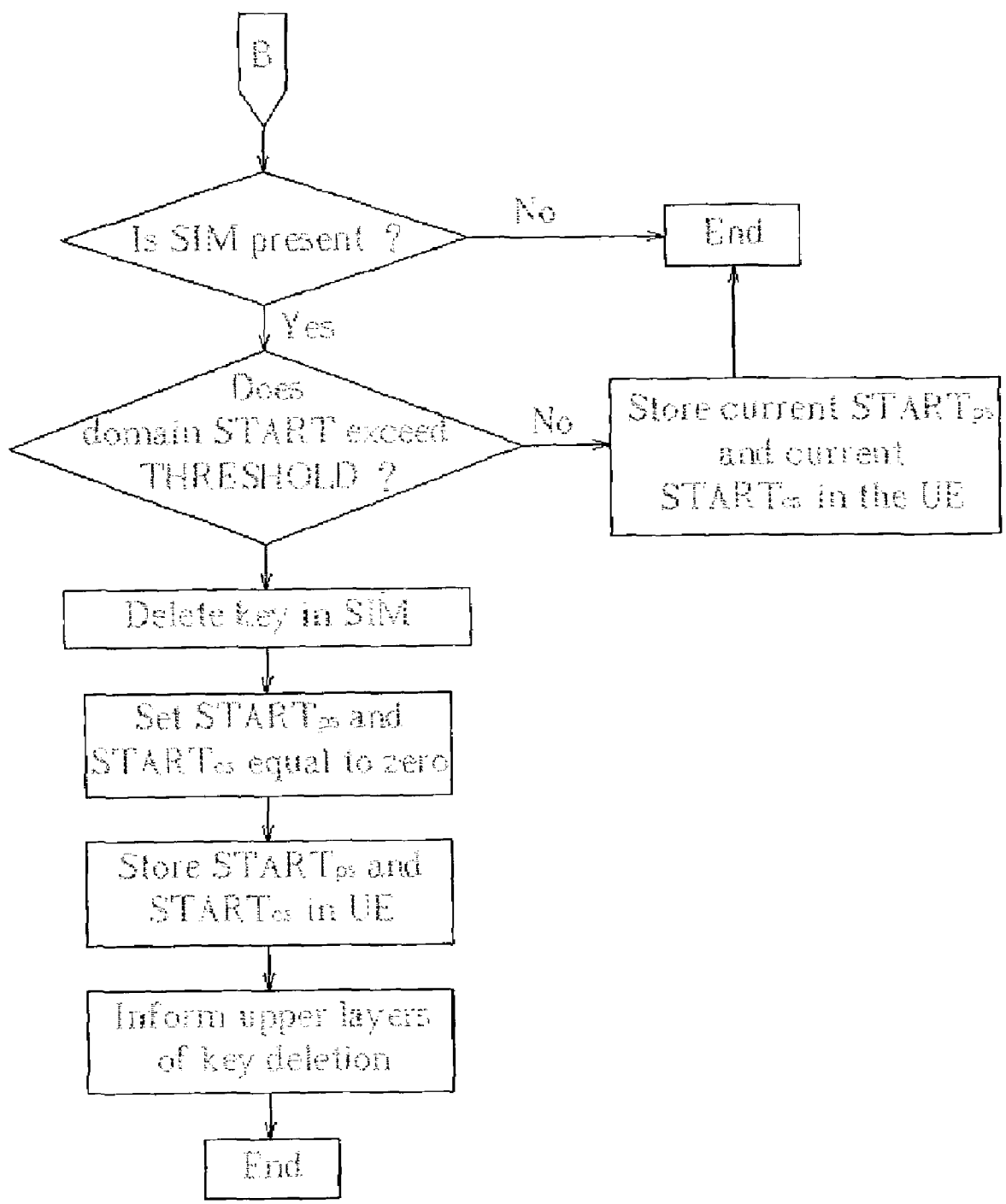

FIGS. 7A and 7B are flow chart diagrams illustrating the above steps of the present invention method. Of course, once the present invention steps are completed, the UE must go on to perform numerous other procedures. These procedures are, however, identical to the prior art, and so are beyond the scope of this invention. Also, it should be noted that the present invention utilizes the prior art predetermined method for calculating START values within a domain, as well as the prior art THRESHOLD-related, USIM-related and SIM-related structures.

Figure 1:
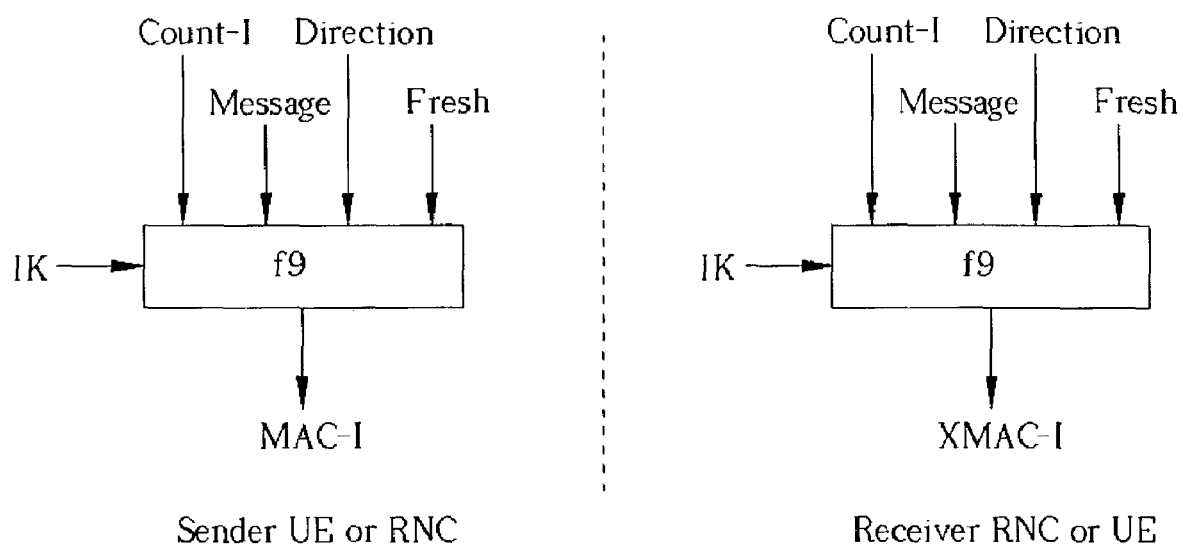
FIG. 1 illustrates the use of an integrity algorithm f9 to authenticate data integrity of a signaling message.
Figure 2:
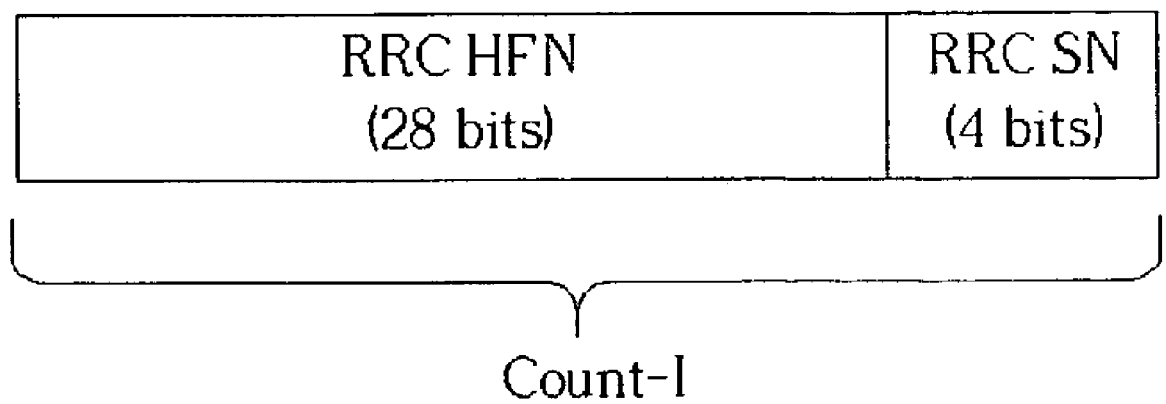
FIG. 2 is a block diagram of the data structure of a COUNT-I value depicted in FIG. 1.
Figure 3:
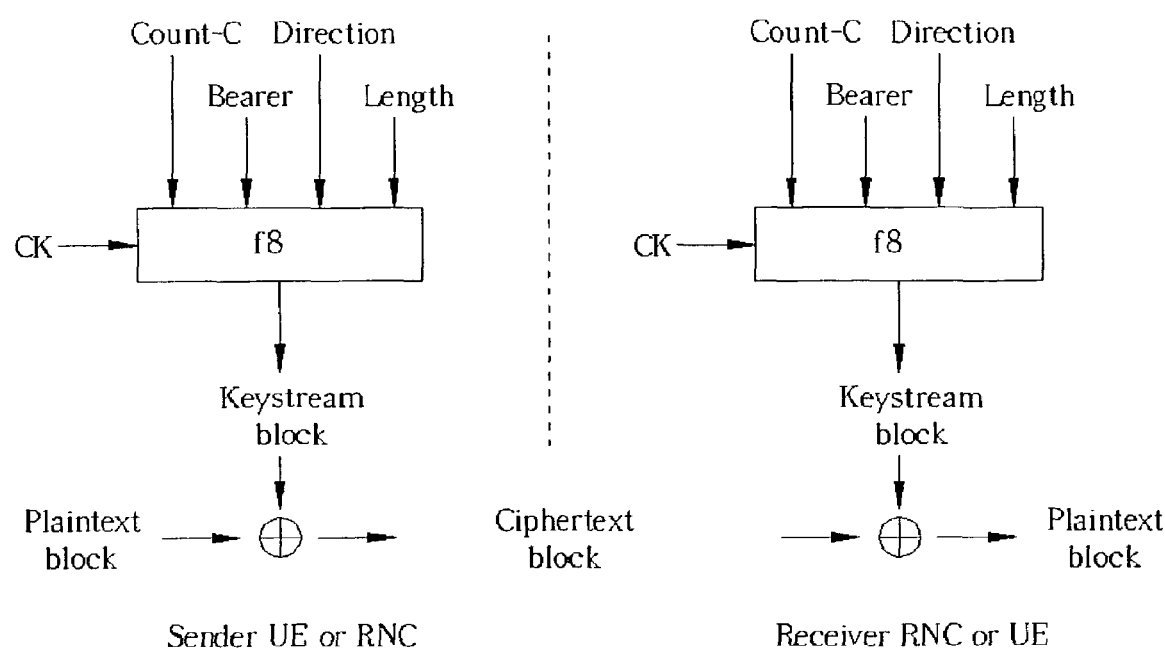
FIG. 3 illustrates ciphering of user and signalling data over a radio access link.
Figure 4:
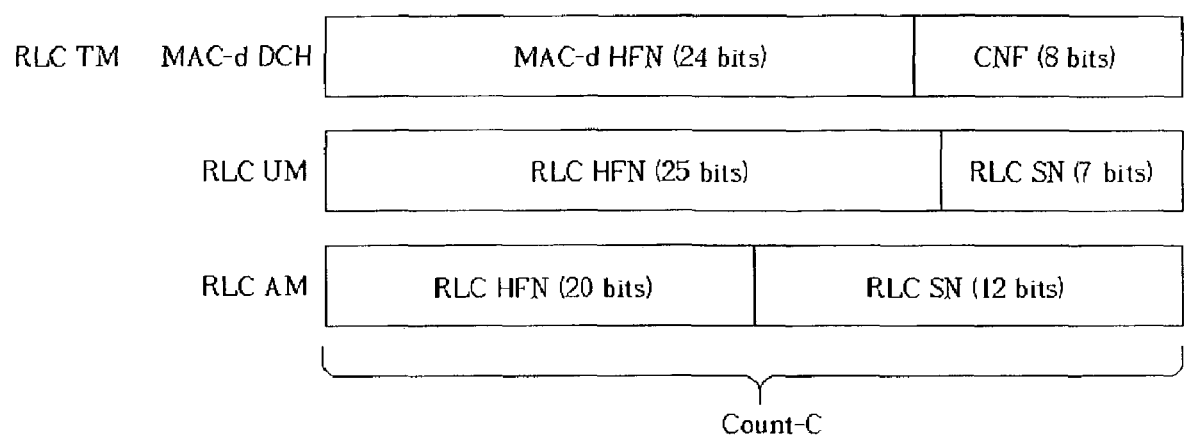
FIG. 4 is a block diagram of a COUNT-C value depicted in FIG. 3 for all connection modes.
Figure 5:
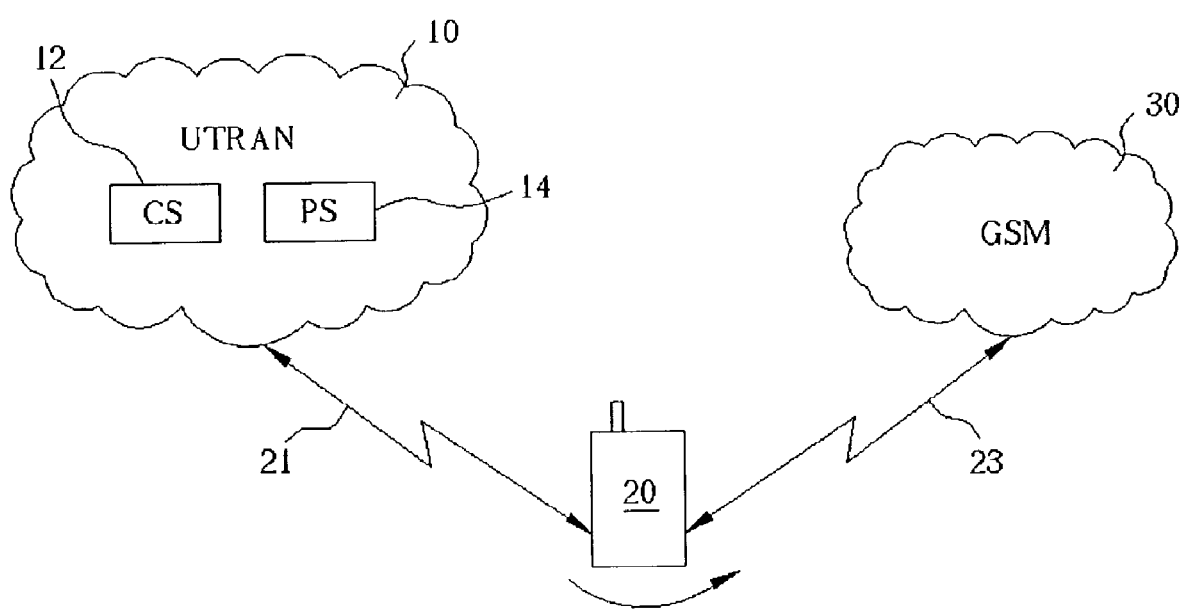
FIG. 5 is a simple block diagram of an Inter-RAT procedure.

Of particular importance to the present in invention is step 200, depicted in FIG. 7A. As there are currently only two domains, the PS domain and the CS domain, step 200 is executed twice: once for the PS domain, and once for the CS domain. The CS domain is provided its own structure in the memory 140, a CS region 141. Similarly, the PS domain is provided a PS region 143 in the memory 140. These regions 141, 143 do not need to be contiguous within the memory 140; that is, the regions 141 and 143 can be scattered throughout the memory 140. Step 200 checks to see if the domain under consideration has already received a new key set 141n, 143n that has been unused for security purposes during the current RRC connection. The current RRC connection is that which was started between the UE 100 and the UTRAN, and which culminated in the successful completion of one of the Inter-RAT procedures currently being processed by the UE. The manner for determining if a newly received key set 141n, 143n has been used for security purposes is known in the art, and so is not elaborated upon here. In general, though, a new key set 141n, 143n is considered unused if it has not been used to encipher data, and has not been used to provide an integrity check value for data. In addition, a newly received key set 141n, 143n would be one that was received during, or in response to, the current RRC connection. As previously explained, it is possible for the UE 100 to obtain a new key set 141n, 143n while continuing to use the old key set 141o, 143o. It should be noted that the key sets 141n, 141o, 143n, 143o include both integrity keys IK (as shown in FIG. 1.) and ciphering keys CK (as shown in FIG. 3). If the newly received key set 141n, 143n is unused, then the corresponding START value 141s, 143s is set to zero. This zero START value 141s, 143s is then stored in USIM 144 memory. The value of zero is preferred, as it provides the maximum usage from a START value. Other non-zero values, however, may be used instead of zero, though they will reduce the overall lifetime of the START value, and hence of the associated key set. The USIM 144 is simply a non-volatile memory structure that is designed specifically for 3GPP protocol purposes. Note that in some implementations the $START_{CS}$ value 141s and the $START_{PS}$ value 143s may, in fact, be within the USIM 144; that is, it may not be necessary to duplicate domain START values. FIG. 6 simply illustrates the most general implementation.

In contrast to the prior art, the present invention provides a verification step after the successful completion of an Inter-RAT procedure that determines if a new key set is unused prior to checking the domain START value. If the new key set is unused, the domain START value is set to zero. The present invention thus ensures that Inter-RAT procedures do not delete new key sets, and hence conserves radio resources.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for handling a security START value in a wireless device, the method comprising:
   the wireless device successfully completing an Inter-RAT procedure selected from a set consisting of Inter-RAT handover, Inter-RAT cell reselection and Inter-RAT cell change order from UTRAN;
   determining if a USIM is present in the wireless device in response to successfully completing the Inter-RAT procedure;
   in response to determining that the USIM is present within the wireless device, determining if a security key set was unused during a current RRC connection; and
   storing a predetermined value into the USIM as a security START value for a CN domain associated with the security key set if the security key set was unused during the current RRC connection;
   wherein the predetermined value is less than a THRESHOLD value that triggers deletion of a security key set.

2. The method of claim 1 wherein the predetermined value is zero.

3. The method of claim 1 further comprising setting the security START value to the predetermined value.

4. The method of claim 1 further comprising performing the following steps if a SIM is present in the wireless device:
   determining if a security key set was unused during a current RRC connection; and
   storing a predetermined value into the wireless device as a security START value for a CN domain associated with the security key set if the security key set was unused during the current RRC connection.

5. The method of claim 4 further comprising:
   if a security START value associated with a CN domain equals or exceeds the THRESHOLD value, then deleting from the SIM a security key associated with the CN domain.

6. The method of claim 5 further comprising:
   deleting from the wireless device a security key set associated with the CN domain, the security key set being derived from the security key associated with the CN domain stored in the SIM.

7. The method claim 5 further comprising setting the security START value associated with the CN domain to the predetermined value.

8. The method of claim 7 further comprising storing the security START value associated with the CN domain in the wireless device if the security START value associated with the CN domain is less than the THRESHOLD value.

9. The method of claim 8 further comprising setting a security START value associated with another CN domain to the predetermined value; and storing the security START value associated with the other CN domain in the wireless device.

10. The method of claim 1 further comprising:
    deleting the security key set if the security START value for the CN domain associated with the security key set exceeds the THRESHOLD value and the Inter-RAT procedure is the inter-RAT cell reselection procedure or the Inter-RAT cell change order from UTRAN procedure; and storing the security START value in the USIM if the security START value for the CN domain associated with the security key set is less than the THRESHOLD value and the Inter-RAT procedure is the inter-RAT cell reselection procedure or the Inter-RAT cell change order from UTRAN procedure.

11. A wireless device comprising a processor and memory, the memory containing program code executable by the processor for performing the following steps:

determining successful completion of an Inter-RAT procedure selected from a set consisting of Inter-RAT handover, Inter-RAT cell reselection and Inter-RAT cell change order from UTRAN;

determining if a USIM is present in the wireless device in response to successfully completing the Inter-RAT procedure;

in response to determining that the USIM is present within the wireless device, determining if a security key set was unused during a current RRC connection; and storing a predetermined value into the USIM as a security START value for a CN domain associated with the security key set if the security key set was unused during the current RRC connection;

wherein the predetermined value is less than a THRESHOLD value that triggers deletion of a security key set.

12. The wireless device of claim 11 wherein the predetermined value is zero.

13. The wireless device of claim 11 further comprising program code for setting the security START value to the predetermined value.

14. The wireless device of claim 11 further comprising program code for performing the following if a SIM is present in the wireless device:

determining if a security key set was unused during a current RRC connection; and storing a predetermined value into the wireless device as a security START value for a CN domain associated with the security key set if the security key set was unused during the current RRC connection.

15. The wireless device of claim 14 further comprising program code for deleting from the SIM a security key associated with the CN domain if a security START value associated with a CN domain equals or exceeds the THRESHOLD value.

16. The wireless device of claim 15 further comprising program code for deleting from the wireless device a security key set associated with the CN domain, the security key set being derived from the security key associated with the CN domain stored in the SIM.

17. The wireless device of claim 15 further comprising program code for setting the security START value associated with the CN domain to the predetermined value.

18. The wireless device of claim 17 further comprising program code for performing storing of the security START value associated with the CN domain in the wireless device if the security START value associated with the CN domain is less than the THRESHOLD value.

19. The wireless device of claim 18 further comprising program code for performing setting of a security START value associated with another CN domain to the predetermined value; and storing the security START value associated with the other CN domain in the wireless device.

20. The wireless device of claim 11 further comprising program code for performing the following steps:

deleting the security key set if the security START value for the CN domain associated with the security key set exceeds the THRESHOLD value and the Inter-RAT procedure is the inter-RAT cell reselection procedure or the Inter-RAT cell change order from UTRAN procedure; and storing the security START value in the USIM if the security START value for the CN domain associated with the security key set is less than the THRESHOLD value and the Inter-RAT procedure is the inter-RAT cell reselection procedure or the Inter-RAT cell change order from UTRAN procedure.

* * * * *